United States Patent
Calman et al.

(10) Patent No.: US 8,611,601 B2
(45) Date of Patent: Dec. 17, 2013

(54) DYNAMICALLY INDENTIFYING INDIVIDUALS FROM A CAPTURED IMAGE

(75) Inventors: Matthew A. Calman, Charlotte, NC (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 127 days.

(21) Appl. No.: 13/342,061

(22) Filed: Jan. 1, 2012

(65) Prior Publication Data

US 2012/0230540 A1    Sep. 13, 2012

Related U.S. Application Data

(60) Provisional application No. 61/450,213, filed on Mar. 8, 2011, provisional application No. 61/508,946, filed on Jul. 18, 2011.

(51) Int. Cl.
G06K 9/00    (2006.01)
H04W 36/00    (2009.01)

(52) U.S. Cl.
USPC .......................... 382/103; 382/219; 455/437

(58) Field of Classification Search
USPC ......... 382/100, 103, 106–107, 115–118, 155, 382/162, 168, 173, 181, 199, 203, 209, 214, 382/219, 232, 243, 254, 274, 276, 291, 294, 382/305, 312; 235/462.45; 707/769; 455/446, 414.2, 437

See application file for complete search history.

(56) References Cited

U.S. PATENT DOCUMENTS

| | | | |
|---|---|---|---|
| 7,016,532 B2 | 3/2006 | Boncyk et al. | |
| 7,155,228 B2 * | 12/2006 | Rappaport et al. | 455/446 |
| 7,403,652 B2 | 7/2008 | Boncyk et al. | |
| 7,412,081 B2 | 8/2008 | Doi | |
| 7,424,303 B2 | 9/2008 | Al-Sarawi | |
| 7,477,780 B2 | 1/2009 | Boncyk et al. | |
| 7,526,280 B2 * | 4/2009 | Jung et al. | 455/414.2 |
| 7,564,469 B2 | 7/2009 | Cohen | |
| 7,565,008 B2 | 7/2009 | Boncyk et al. | |
| 7,680,324 B2 | 3/2010 | Boncyk et al. | |
| 7,775,437 B2 * | 8/2010 | Cohen | 235/462.45 |
| 7,792,738 B2 | 9/2010 | Channell | |
| 7,881,529 B2 | 2/2011 | Boncyk et al. | |
| 7,899,243 B2 | 3/2011 | Boncyk et al. | |
| 7,899,252 B2 * | 3/2011 | Boncyk et al. | 382/181 |
| 8,138,930 B1 | 3/2012 | Heath | |
| 8,392,450 B2 * | 3/2013 | Blanchflower et al. | 707/769 |

(Continued)

OTHER PUBLICATIONS

International Search Report and Written Opinion of the International Searching Authority for International Application No. PCT/US2012/028008 mailed Jun. 4, 2012.

(Continued)

Primary Examiner — Seyed Azarian
(74) Attorney, Agent, or Firm — Michael A. Springs; Moore and Van Allen, PLLC; Patrick B. Horne

(57) ABSTRACT

Embodiments of the invention are directed to methods and apparatuses for capturing a real-time video stream using a mobile device, determining, using a processor, which images from the real-time video stream are associated with individuals meeting a user defined criteria, and presenting on a display of the real-time video stream, one or more indicators, each indicator being associated with an image determined to be a person meeting the predefined criteria.

35 Claims, 8 Drawing Sheets

(56) References Cited

U.S. PATENT DOCUMENTS

| | | | |
|---|---|---|---|
| 8,483,484 B2* | 7/2013 | Boncyk et al. | 382/181 |
| 2003/0064705 A1 | 4/2003 | Desiderio | |
| 2004/0021584 A1 | 2/2004 | Hartz et al. | |
| 2004/0024709 A1 | 2/2004 | Yu et al. | |
| 2006/0100951 A1 | 5/2006 | Mylet et al. | |
| 2007/0140595 A1 | 6/2007 | Taylor et al. | |
| 2008/0040278 A1 | 2/2008 | Dewitt | |
| 2008/0214210 A1 | 9/2008 | Rasanen et al. | |
| 2008/0268876 A1 | 10/2008 | Gelfand et al. | |
| 2009/0094125 A1 | 4/2009 | Killian et al. | |
| 2009/0102859 A1 | 4/2009 | Athsani et al. | |
| 2009/0140839 A1 | 6/2009 | Bishop et al. | |
| 2009/0144164 A1 | 6/2009 | Wane et al. | |
| 2009/0171850 A1 | 7/2009 | Yuval | |
| 2009/0182748 A1 | 7/2009 | Walker | |
| 2009/0204511 A1 | 8/2009 | Tsang | |
| 2009/0250515 A1 | 10/2009 | Todd et al. | |
| 2010/0130226 A1 | 5/2010 | Arrasvuori et al. | |
| 2010/0185529 A1 | 7/2010 | Chesnut et al. | |
| 2010/0250581 A1 | 9/2010 | Chau | |
| 2011/0022540 A1 | 1/2011 | Stern et al. | |
| 2011/0034176 A1 | 2/2011 | Lord et al. | |
| 2011/0119155 A1 | 5/2011 | Hammad et al. | |
| 2011/0202466 A1 | 8/2011 | Carter | |

OTHER PUBLICATIONS

Pending U.S. Appl. No. 13/342,041, filed Jan. 1, 2012.
Pending U.S. Appl. No. 13/342,042, filed Jan. 1, 2012.
Pending U.S. Appl. No. 13/342,044, filed Jan. 1, 2012.
Pending U.S. Appl. No. 13/342,045, filed Jan. 1, 2012.
Pending U.S. Appl. No. 13/342,046, filed Jan. 1, 2012.
Pending U.S. Appl. No. 13/342,047, filed Jan. 1, 2012.
Pending U.S. Appl. No. 13/342,048, filed Jan. 1, 2012.
Pending U.S. Appl. No. 13/342,050, filed Jan. 1, 2012.
Pending U.S. Appl. No. 13/342,051, filed Jan. 1, 2012.
Pending U.S. Appl. No. 13/342,052, filed Jan. 1, 2012.
Pending U.S. Appl. No. 13/342,053, filed Jan. 1, 2012.
Pending U.S. Appl. No. 13/342,055, filed Jan. 1, 2012.
Pending U.S. Appl. No. 13/342,056, filed Jan. 1, 2012.
Pending U.S. Appl. No. 13/342,057, filed Jan. 1, 2012.
Pending U.S. Appl. No. 13/342,058, filed Jan. 1, 2012.
Pending U.S. Appl. No. 13/342,059, filed Jan. 1, 2012.
Pending U.S. Appl. No. 13/342,060, filed Jan. 1, 2012.
Pending U.S. Appl. No. 13/342,062, filed Jan. 1, 2012.
Pending U.S. Appl. No. 13/342,063, filed Jan. 1, 2012.
Pending U.S. Appl. No. 13/342,064, filed Jan. 1, 2012.
Pending U.S. Appl. No. 13/342,065, filed Jan. 1, 2012.
Pending U.S. Appl. No. 13/342,066, filed Jan. 1, 2012.
Pending U.S. Appl. No. 13/342,068, filed Jan. 1, 2012.
Pending U.S. Appl. No. 13/342,069, filed Jan. 1, 2012.
Pending U.S. Appl. No. 13/342,070, filed Jan. 1, 2012.
Pending U.S. Appl. No. 13/342,071, filed Jan. 1, 2012.
Pending U.S. Appl. No. 13/342,072, filed Jan. 1, 2012.
Pending U.S. Appl. No. 13/365,996, filed Feb. 3, 2012.
International Search Report and Written Opinion of the International Searching Authority for International Application No. PCT/US2012/028036 mailed Jun. 4, 2012.
ISA/US Commissioner for Patents, PCT International Search Report and the Written Opinion of the International Searching Authority for International Application No. PCT/US12/48697 date of completion Sep. 24, 2012, date of mailing Oct. 12, 2012.
International Search Report and Written Opinion, corresponding to International Patent Application No. PCT/US12127890, dated Feb. 5, 2013.
International Preliminary Report on Patentability and Written Opinion dated Sep. 10, 2013 for International Application No. PCT/US2012/027890.
International Preliminary Report on Patentability and Written Opinion dated Sep. 10, 2013 for International Application No. PCT/US2012/028036.
International Preliminary Report on Patentability and Written Opinion dated Sep. 10, 2013 for International Application No. PCT/US2012/027892.
International Preliminary Report on Patentability and Written Opinion dated Sep. 10, 2013 for International Application No. PCT/US2012/028008.
International Preliminary Report on Patentability and Written Opinion dated Sep. 10, 2013 for International Application No. PCT/US2012/027912.

* cited by examiner

# DYNAMICALLY INDENTIFYING INDIVIDUALS FROM A CAPTURED IMAGE

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/508,946, filed Jul. 18, 2011, entitled "Dynamically Identifying Individuals From a Captured Image," the entirety of each of which is incorporated herein by reference.

BACKGROUND

Modern mobile devices, such as smart phones and the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common as standardized features. Such features include, but are not limited to, location-determining devices, such as Global Positioning System (GPS) devices; sensor devices, such as accelerometers; and high-resolution video cameras.

As the hardware capabilities of such mobile devices have increased, so to have the applications (i.e., software) that rely on the hardware advances. One such example of innovative software is a category known as augmented reality (AR), or more generally referred to as mediated reality. One such example of an AR application platform is Layar, available from Layar, Amsterdam, the Netherlands.

The Layar platform technology analyzes real-time video data, location data, compass direction data and the like in combination with information related to the objects, locations or the like in the video stream to create browse-able "hotspots" or "tags" that are superimposed on the mobile device display, resulting in an experience described as "reality browsing".

In many circumstances it may be useful to be able to quickly identify an individual or individuals from a grouping of a number of people. Presently, one has to rely on memory and visual cues to identify individuals. Relying on memory and visual cues is limited by the one's memory and ability to perceive identifying features of an individual from a gathering of a number of people. Moreover, if one is trying to identify individuals who the person does not know, or identify individuals based on what the individual looked like many years ago, one's memory and reliance on visual cues may be insufficient to identify the intended individual. Furthermore, if a person is trying to identify individuals not based familiarity with the individual but according to certain characteristics, such as national origin, demographic, appearance of health, intoxication etc., a person may be limited in his ability to identify such individuals absent additional information or specialized training.

Therefore, a need exists to implement real-time video analysis, i.e., AR or the like, to assist the user of mobile devices with dynamically identifying individuals.

SUMMARY

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus, systems and computer program products are described herein that provide for using real-time video analysis, such as AR or the like, to assist the user of mobile devices with dynamically identifying individuals. Through the use of real-time image object recognition, facial features, facial symmetry, eye color, bone structure, hair color, hair style, body type, unique identifiers, clothing, locations and other features that can be recognized in a real-time video stream can be matched to images of individuals to assist the user with identifying one or more individuals. In specific embodiments, the data that is used to match to the images in the real-time video stream is specific to financial institutions, such as customer data, transaction data, security data and the like. In this regard, some of the embodiments herein disclosed utilize financial institution data, which is uniquely specific to financial institutions, in providing information to mobile devices users in connection with real-time video stream analysis. These embodiments are exemplary.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

Some embodiments of the present invention provide a method wherein a mobile device is used to capture a real-time video stream. A processor analyzes the real-time video stream to determine which images present in the video stream are associated with a person meeting a predetermined criteria. The mobile device then presents on a display the real-time video stream with one or more indicators associated with an image determined to be a person meeting the user defined criteria. In some embodiments the mobile device is a mobile phone.

In some embodiments of the invention, determining which images from the real-time video stream are associated with a person meeting a predetermined criteria also includes identifying, via the processor, an individual from the image captured in the real-time video stream, collecting additional information regarding the identified individual and correlating the additional information to the predetermined criteria.

Consistent with certain embodiments of the invention, identifying an individual from the image captured in the real-time video stream involves collecting images that are available to the user and then comparing identifiable characteristics from the captured images with the images available to the user. If the comparison of the images suggests a match, additional information about the individual is identified.

In some embodiments, comparing identifiable characteristics from the captured images with the images available to the user involves modifying the images available to the user to adjust for changes that are likely to have occurred to the individual due to the passage of time.

In certain embodiments the images available to the user comprise images that are publicly available, images that are available from social networking sites of which the user is a member and images stored on an accessible memory.

Consistent with some embodiments of the invention, the additional information regarding the identified individual is taken from publicly available information, information from social networks wherein the user and the identified individual are connected, information from electronic communications available to the user or information stored on the identified individual's computing devices if the devices are in communication with the mobile device. In further embodiments, the additional information is collected from account history data, transactional data and biographical data available to a merchant.

In determining which images from the real-time video stream are associated with a person meeting a predetermined criteria, some embodiments involve receiving from the user one or more criteria.

Some embodiments of the invention will also include the step of communicating information to persons identified as meeting the predetermined criteria.

In certain embodiments the indicators presented via the display are selectable by the user. In some such embodiments, the indicators, upon being select present the user with additional information about the person meeting the predetermined criteria. In still further embodiments, the indicators, upon being selected present the user with the ability to take a first action in relation to the person meeting the user defined criteria, such as sending an electronic message to the person, calling the person, purchasing good and sending the goods to the person or purchasing services for the person.

Embodiments of the invention also provide an apparatus where the apparatus has a device for capturing a real-time video stream, a processor configured to determine which images from the real-time video stream are associated with a person meeting user defined criteria and a display for presenting the real-time video stream with one or more indicators, each indicator being associated with an image determined to be a person meeting a user defined criteria. In some embodiments, the device is a mobile device.

In some embodiments of the invention the processor is further configured to identify an individual from the image captured in the real-time video stream and collect additional information regarding the identified individual. In such embodiments the processor is also configured to correlate the additional information collected to a predetermined criteria.

In some embodiments of the invention, in identifying an individual from the image captured in the real-time video stream the processor is also configured to collect images available to the user, compare identifiable characteristics from the captured images with the images available to the user and identify information about the individual if the comparison of the images suggests a match. In some such embodiments, the processor is further configured to modify the images available to the user to adjust for changes that are likely to have occurred to the individual due to the passage of time. The images available to the user may include publicly available images, images from social networking sites of which the user is a member and images stored on an accessible memory source.

Consistent with certain embodiments, the additional information regarding the identified individual may include publicly available information, information from social networking sites wherein the user and the identified individual are connected, information from the electronic communication available to the user or information stored on the identified individual's computer devices if the devices are in communication with the apparatus. In some embodiments, the additional information regarding the identified individual is collected from account history data, transactional data and biographical data available to a merchant.

In determining which images from the real-time video stream are associated with a person meeting a predetermined criteria, in some embodiments the processor is further configured to receive from the user one or more criteria. In some embodiments the processor will also be configured to communicate information to persons identified as meeting the predetermined criteria.

In certain embodiments of the invention the indicators presented on the display are selectable by the user. In some such embodiments, the indicators upon being selected present the user, via the display, with additional information about the person meeting the predetermined criteria. In further embodiments, the processor is configured to present the user with the ability to take a first action in relation to the person meeting the predetermined criteria upon selection of an indicator. Such a first action may include sending an electronic message to the person, calling the person, purchasing goods and sending the goods to the person or purchasing services for the person.

Embodiments of the invention also provide a computer program product comprising a non-transitory computer-readable medium having computer-executable code stored thereon. In one embodiment, the computer-executable code includes: a first code portion configured to capture, via a mobile device, a real-time video stream, a second code portion configured to determine which images from the real-time video stream are associated with individuals meeting predetermined criteria and a third code portion configured to present on a display the real-time video stream with one or more indicators, each indicator associated with an image determined to be an individual meeting the predetermined criteria.

In some embodiments, the second code portion in determining which images from the real-time video stream are associated with a person meeting a predetermined criteria, is further configured to identify the individual from the image captured in the real-time video stream, collect additional information regarding the identified individual and correlate the additional information to the predetermined criteria. The second code portion in identifying an individual from the image captured in the real-time video stream may also be configured to collect images available to the user, compare identifiable characteristics from the captured images with the images available to the user and identify information about the individual if the comparison of the captured image to the images available to the user suggests a match The features, functions, and advantages that have been discussed may be achieved independently in various embodiments of the present invention or may be combined with yet other embodiments, further details of which can be seen with reference to the following description and drawings

BRIEF DESCRIPTION OF THE DRAWINGS

Figure 1:
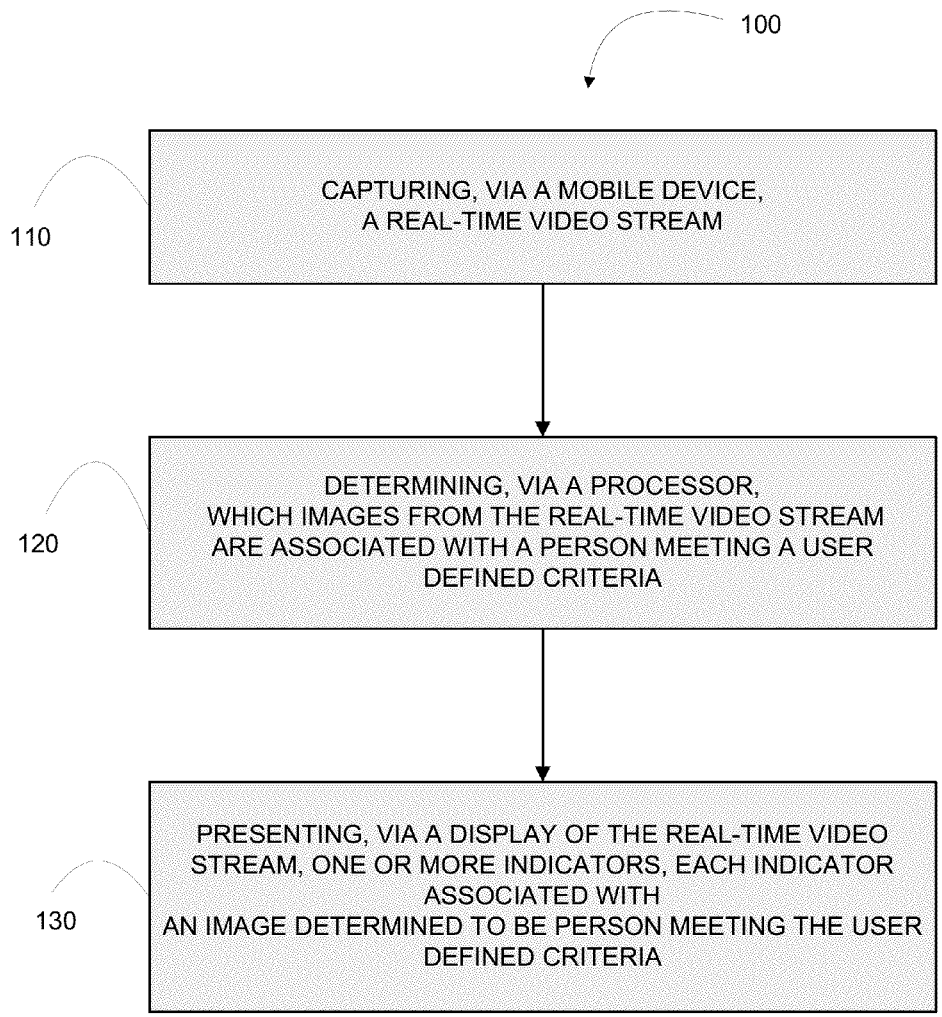

Having thus described embodiments of the invention in general terms, reference will now be made to the accompanying drawings, which are not necessarily drawn to scale, and wherein:

FIG. 1 is a flow diagram illustrating a process flow for an apparatus or system for dynamically identifying individuals from a captured image, in accordance with an embodiment of the invention.

Figure 2:
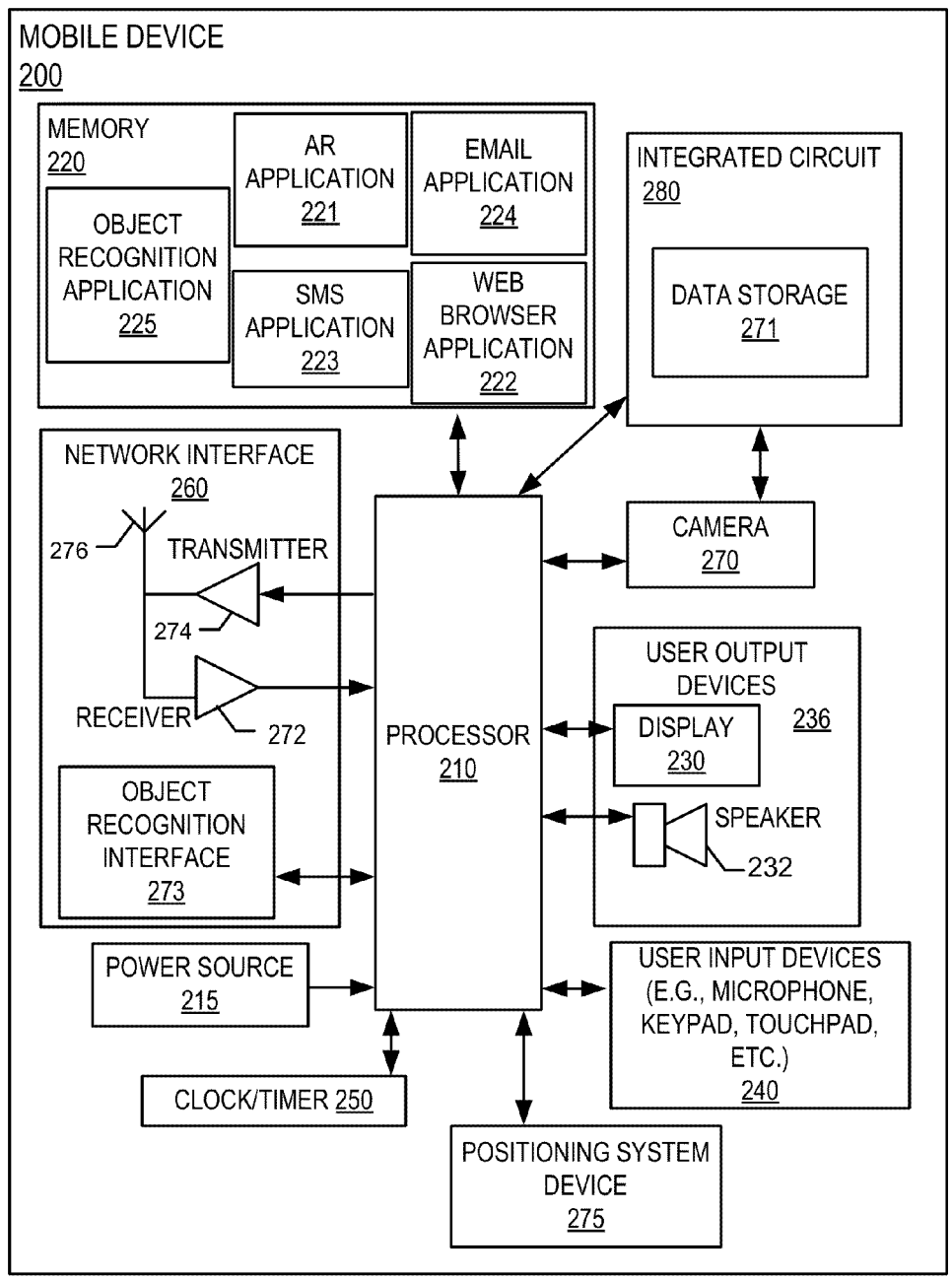
Figure 3:
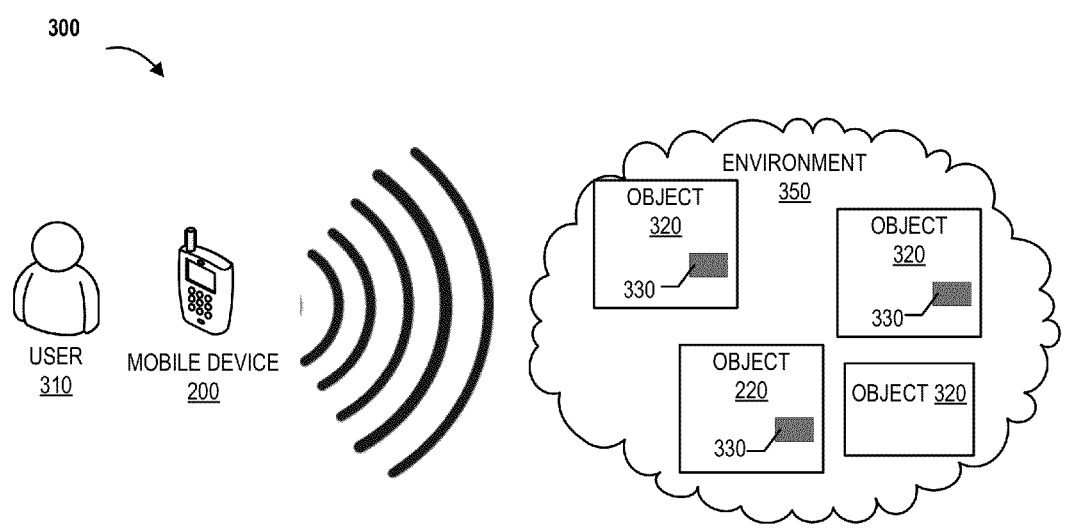
Figure 4:
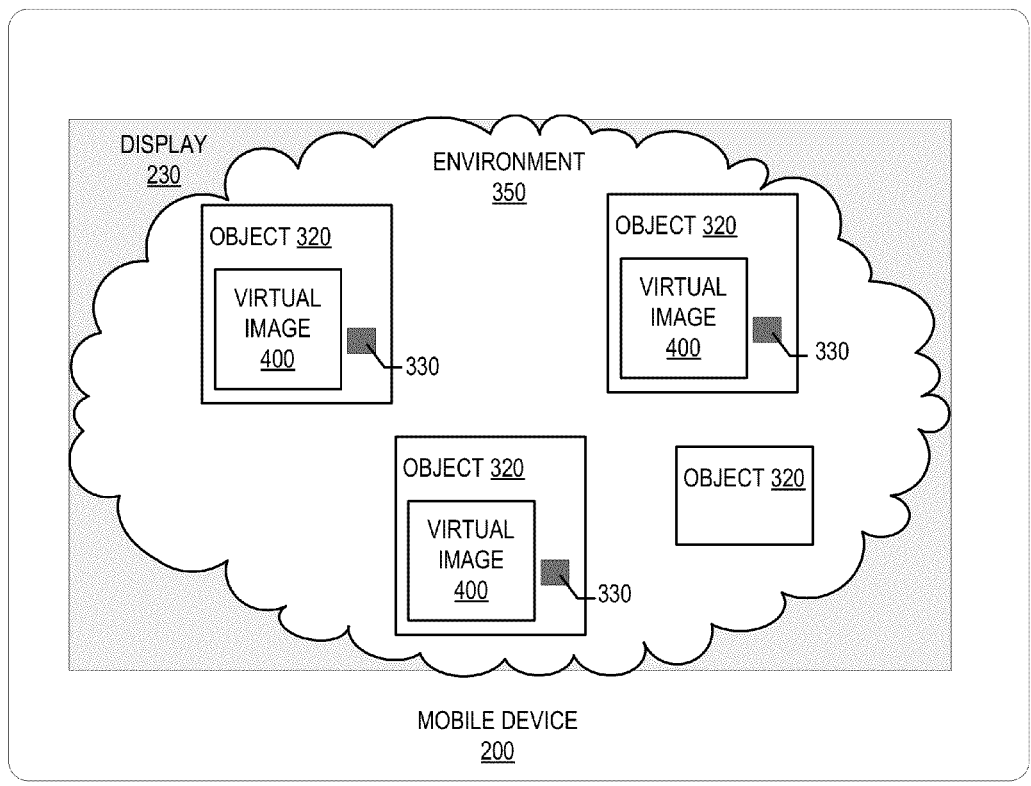
Figure 5:
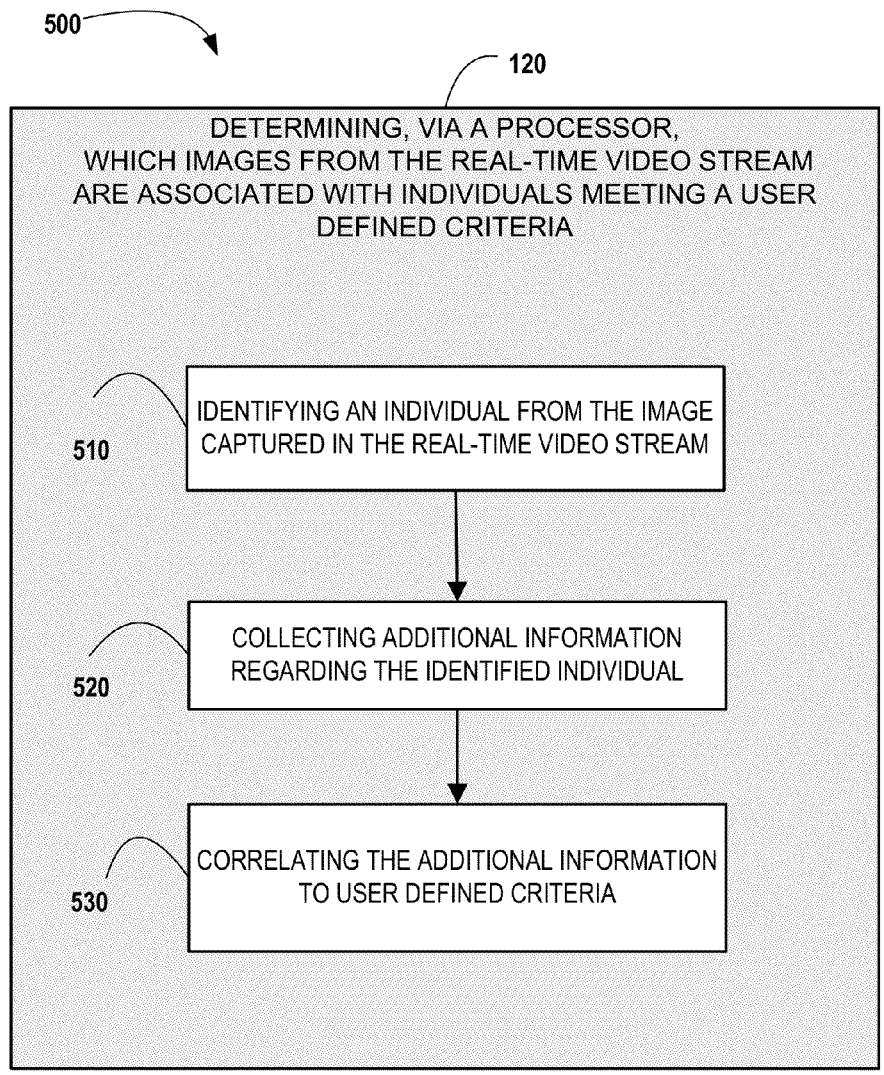
Figure 6:
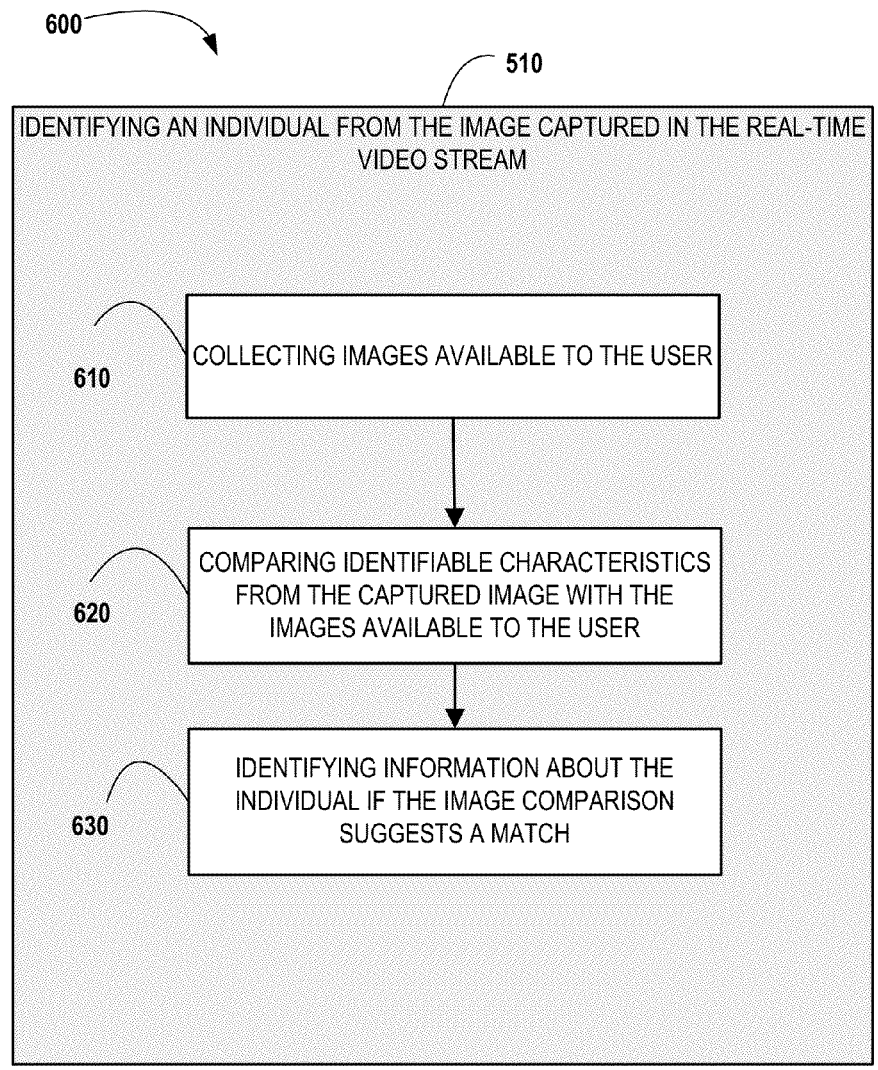
Figure 7:
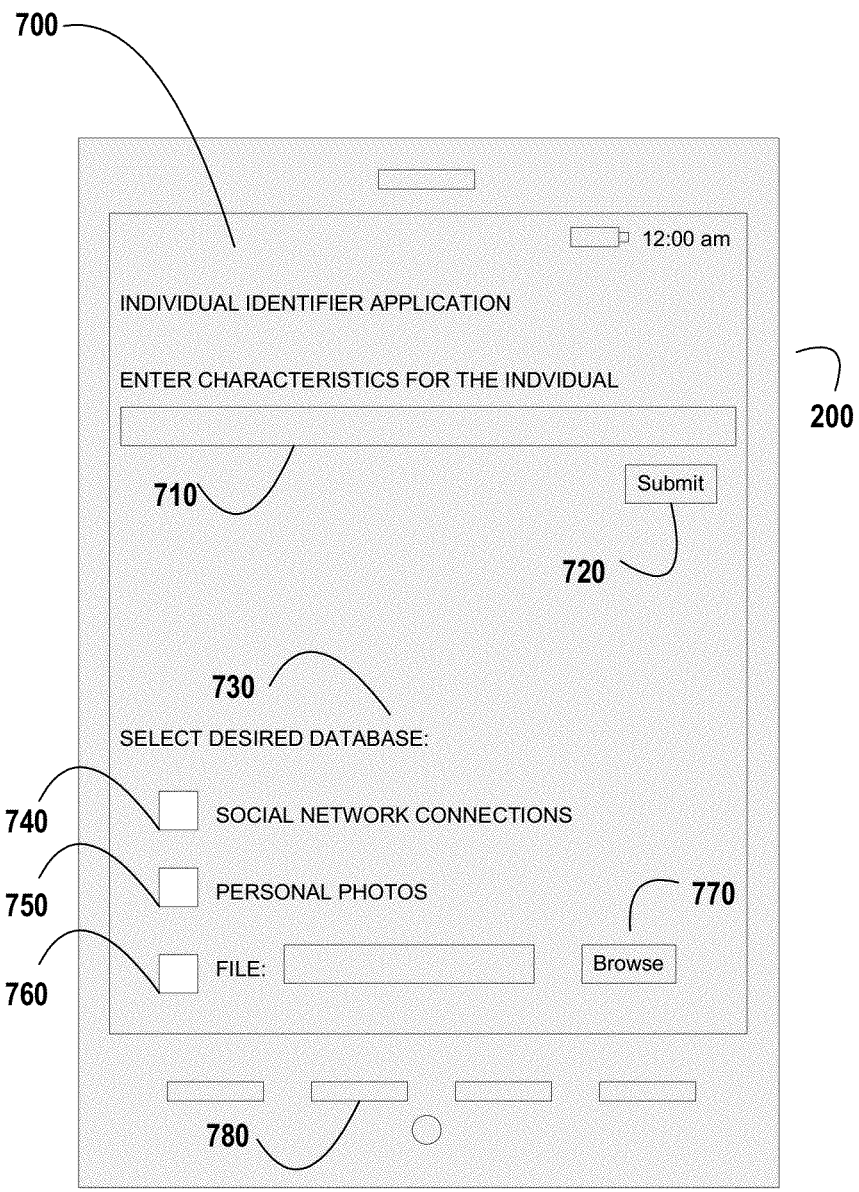
Figure 8:
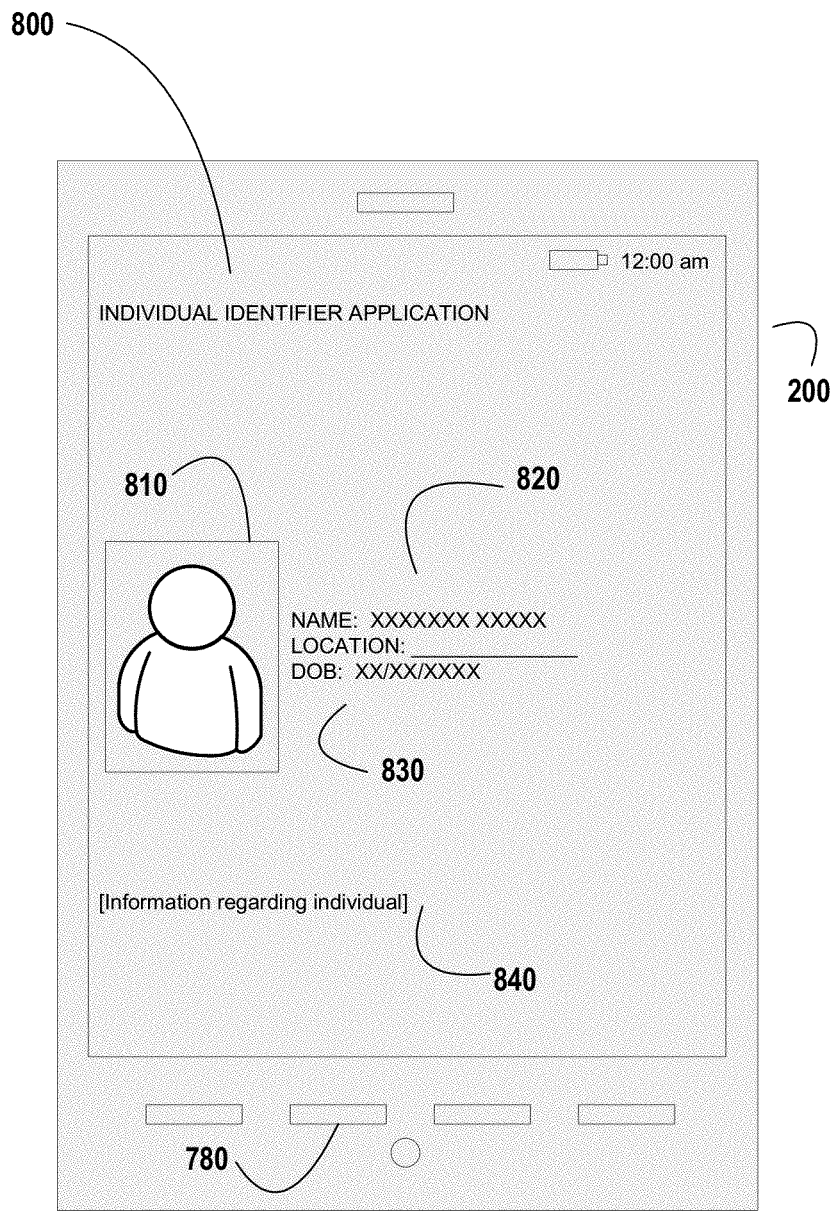

FIG. 2 is a block diagram illustrating a mobile device, in accordance with an embodiment of the invention;

FIG. 3 is a block diagram illustrating an AR environment, in accordance with an embodiment of the invention;

FIG. 4 is a block diagram illustrating a mobile device, in accordance with an embodiment of the invention;

FIG. 5 is a flow diagram illustrating a process flow for an apparatus or system for determining which images from the real-time video stream are associated with a person meeting a user defined criteria, in accordance with an embodiment of the invention;

FIG. 6 is a flow diagram illustrating a process flow for an apparatus or system for identifying an individual from the image captured in the real-time video stream in accordance with an embodiment of the invention;

FIG. 7 illustrates an exemplary display page of a user interface for receiving user defined criteria, in accordance with an embodiment of the invention;

FIG. 8 illustrates an exemplary display page of a user interface for viewing additional information regarding an identified individual, in accordance with an embodiment of the invention;

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, methods, systems, computer programs and the like are herein disclosed that provide for using real-time video analysis, such as AR or the like to assist the user of mobile devices with identifying individuals.

The methods, systems, computers programs and the like disclosed herein use real-time vision object recognition to identify facial features, facial symmetry, eye color, bone structure, hair color, hair style, body type, unique identifiers, clothing, locations, objects, text and other features that can be recognized in the real-time video stream and can be matched to data associated with specific individuals to assist the user with identifying individuals. In specific embodiments, images available to the user will be leveraged to assist the user in identifying a specific person or persons. In other embodiments, a business or merchant will leverage images and data specific to the business, such as customer data, transactional data and security data to identify individuals with specific characteristics in order to target product or service offers.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

FIG. 1 illustrates a general process flow 100 for dynamically identifying individuals from a captured image in accordance with an embodiment of the invention. As represented by block 110 a mobile device is used to capture a real-time video stream. Then, as represented by block 120 a processor determines which images from the real-time video stream are associated with individuals meeting a user defined criteria. As represented by block 130, the real-time video stream is then presented on a display with one or more indicators, each indicator being associated with an image determined to be an individual meeting the user defined criteria. Embodiments of the process 100, and systems and apparatus for performing the process 100, are described in greater detail below with reference to FIGS. 1-8.

FIG. 2 illustrates an embodiment of a mobile device 200 that may be configured to execute AR functionality. A "mobile device" 200 may be any mobile communication device, such as a cellular telecommunications device (i.e., a cell phone or mobile phone), personal digital assistant (PDA), smartphone, a mobile Internet accessing device, or other mobile device including, but not limited to portable digital assistants (PDAs), pagers, mobile televisions, gaming devices, laptop computers, tablet computers, cameras, video recorders, audio/video players, radios, GPS devices, and any combination of the aforementioned, or the like.

The mobile device 200 may generally include a processor 210 communicably coupled to such components as a memory 220, user output devices 236, user input devices 240, a network interface 260, a power source 215, a clock or other timer 250, a camera 270, a positioning system device 275 (e.g., a Global Positioning System (GPS) device), one or more integrated circuits 280, etc.

The processor 210, and other processors described herein, may generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 may be allocated between these devices according to their respective capabilities. The processor 210 thus may also include the functionality to encode and interleave messages and data prior to modulation and transmission. The processor 210 may additionally include an internal data modem. Further, the processor 210 may include functionality to operate one or more software programs or applications, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 may also be capable of operating applications, such as an object recognition application 225. The object recognition application 225 may be downloaded from a server and stored in the memory 220 of the mobile device 200. Alternatively, the object recognition application 225 may be pre-installed and stored in a memory in the integrated circuit 280 or operated directly from a website operably linked to the mobile device 200 through the network interface 260. In embodiments, where the object recognition application 225 is pre-installed or run from a website, the user may not need to download the object recognition application 225 from a server.

The integrated circuit 280 may include the necessary circuitry to provide the object recognition functionality to the mobile device 200. Generally, the integrated circuit 280 will include data storage 271 which may include data associated with the objects within a real-time video stream that the object recognition application 225 identifies as having certain marker(s) (discussed in relation to FIG. 3). The integrated circuit 280 and/or data storage 271 may be an integrated circuit, a microprocessor, a system-on-a-chip, a microcontroller, or the like. As discussed above, in one embodiment, the integrated circuit 280 may provide the AR functionality to the mobile device 200.

Of note, while FIG. 2 illustrates the integrated circuit 280 as a separate and distinct element within the mobile device 200, it will be apparent to those skilled in the art that the integrated circuit 280 functionality may be incorporated within other elements in the mobile device 200. For instance, the functionality of the integrated circuit 280 may be incorporated within the mobile device memory 220 and/or the processor 210. In a particular embodiment, the functionality of the integrated circuit 280 is incorporated in an element within the mobile device 200 that provides object recognition capabilities to the mobile device 200. Moreover, the functionality may be part of the firmware of the mobile device 200. Still further, the integrated circuit 280 functionality may be included in a removable storage device such as an SD card or the like.

The processor 210 may be configured to use the network interface 260 to communicate with one or more other devices on a network. In this regard, the network interface 260 may include an antenna 276 operatively coupled to a transmitter 274 and a receiver 272 (together a "transceiver"). The processor 210 may be configured to provide signals to and receive signals from the transmitter 274 and receiver 272, respectively. The signals may include signaling information in accordance with the air interface standard of the applicable cellular system of the wireless telephone network that may be part of the network. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 200 may also be configured to operate in accordance with non-cellular communication mechanisms, such as via a wireless local area network (WLAN) or other communication/data networks.

The network interface 260 may also include an object recognition interface 273 in order to allow a user to execute some or all of the above-described processes with respect to the object recognition application 225 and/or the integrated circuit 280. The object recognition interface 273 may have access to the hardware, e.g., the transceiver, and software previously described with respect to the network interface 260. Furthermore, the object recognition interface 273 may have the ability to connect to and communicate with an external data storage on a separate system within the network as a means of recognizing the object(s) in the video stream.

As described above, the mobile device 200 may have a user interface that includes user output devices 236 and/or user input devices 240. The user output devices 236 may include a display 230 (e.g., a liquid crystal display (LCD) or the like) and a speaker 232 or other audio device, which are operatively coupled to the processor 210. The user input devices 240, which may allow the mobile device 200 to receive data from a user, may include any of a number of devices allowing the mobile device 200 to receive data from a user, such as a keypad, keyboard, touch-screen, touchpad, microphone, mouse, joystick, stylus, other pointer device, button, soft key, and/or other input device(s).

The mobile device 200 may further include a power source 215. Generally, the power source 215 is a device that supplies electrical energy to an electrical load. In one embodiment, power source 215 may convert a form of energy such as solar energy, chemical energy, mechanical energy, etc. to electrical energy. Generally, the power source 215 in a mobile device 200 may be a battery, such as a lithium battery, a nickel-metal hydride battery, or the like, that is used for powering various circuits, e.g., the transceiver circuit, and other devices that are used to operate the mobile device 200. Alternatively, the power source 215 may be a power adapter that can connect a power supply from a power outlet to the mobile device 200. In such embodiments, a power adapter may be classified as a power source "in" the mobile device.

The mobile device 200 may also include a memory 220 operatively coupled to the processor 210. As used herein, memory may include any computer readable medium configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory may additionally or alternatively include an electrically erasable programmable read-only memory (EEPROM), flash memory or the like.

The memory 220 may store any of a number of applications or programs which comprise computer-executable instructions/code executed by the processor 210 to implement the functions of the mobile device 200 described herein. For example, the memory 220 may include such applications as an AR application 221 (described herein in relation to FIG. 4), a web browser application 222, an SMS application 223, an email application 224, an object recognition application 225 etc.

Referring to FIG. 3, a block diagram illustrating an object recognition experience 300 in which a user 310 utilizes a mobile device 200 to capture real-time video of an environment 350 is shown. As denoted earlier, the mobile device 200 may be any mobile communication device. The mobile device 200 has the capability of capturing real-time video of the surrounding environment 350. The real-time video capture may be by any means known in the art. In one particular embodiment, the mobile device 200 is a mobile telephone equipped with a camera 270 capable of video capture.

The environment 350 contains a number of objects 320. Some of such objects 320 may include a marker 330 identifiable to the mobile device 200, in some embodiments through an object recognition application that is executed on the mobile device 200 or within the wireless network. A marker 330 may be any type of marker that is a distinguishing feature that can be interpreted by the object recognition application 225 to identify specific objects 320. For instance in identifying an individual, a marker 330 may be facial features, facial symmetry, eye color, bone structure, hair color, hair style, body type, unique identifiers, shapes, ratio of size of one feature to another feature, skin color, height etc. In some embodiments, the marker 330 may be audio and the mobile device 200 may be capable of utilizing audio recognition to identify words or the unique qualities of an individual's voice. The marker 330 may be any size, shape, etc. Indeed, in some embodiments, the marker 330 may be very small relative to the object 320 such as a mole or birth mark on an individual's skin, whereas, in other embodiments, the marker 330 may be the entire object 320 such as the unique height and proportion of the individual.

In some embodiments, the marker 330 is not actually a physical feature associated with the individual. For instance, the marker 330 may be some type of identifiable feature, such as objects, logos, artwork, products, text, locations and other features that indicate that the object 320 is nearby. The marker 330 may be anything that enables the objet recognition application 225 to interpret to a desired confidence level what the object is. For example, the mobile device 200 may capture a series of numbers on the façade of a building, collect the user's position using the positioning system device 275 and correlate that position and the numbers to being at a specific residential address owned by an individual stored in the user's address book in the memory 220 of the mobile device 200. The mobile device 200 may then use the web browser application 222 and network interface 260 to access the individual's profile on a social network through which the individual and the user are connected and determine that the individual is single and living away from his hometown and conclude that the person who answers the door at this address is the same individual. Accordingly, the markers 330 associated with the individual's house and other available information were sufficient to identify the individual without relying on the markers 330 of the individual.

The marker 330 may also be or include social network data, such as data retrieved or communicated from the Internet, such as micro-blog entries, blog posts, social networking site posts, various types of messages and/or the like. In other embodiments, the marker 330 is provided in addition to social network data as mentioned above. For example, the mobile device 200 may capture a video stream and/or one or more still shots of a large gathering of people. In this example, one more people are dressed as characters in costume and present at a specific location. The mobile device 200, object recognition application 225 and/or the AR application 221 may identify several social network markers 330, such as posts, blogs, micro-blog entries, messages, and/or the like indicating the presence of one or more known characters at the specific location. In this way, the mobile device 200 and associated applications may communicate information regarding the social media communications to the user and/or use the information regarding the social media communications in conjunction with other methods of object recognition. For example, the mobile device 200, object recognition application 225 and/or AR application 221 performing the recognition of the characters at the specified location may confirm that the characters being identified are in fact the correct characters based on the retrieved social media communications.

While FIG. 3 illustrates that the objects 320 with markers 330 only include a single marker 330, it will be appreciated that the object 320 may have any number of markers 330 with each equally capable of identifying the object 330. Similarly, multiple markers 330 may be identified by the object recognition application 225 such that the combination of the markers 330 may be utilized to identify the object 320. For example, consider a situation where the mobile device 200 is confronted with identical twins and the mobile device 200 utilizes facial recognition markers 330 to identify the individuals as being the twins and utilizes a separate marker 330 such as a wedding ring, glasses, a tattoo etc. to correctly differentiate between the twins.

In some embodiments, an marker 330 may be the location of the object 320. In such embodiments, the mobile device 200 may utilize GPS software to determine the location of the user 310. As noted above, a location-based marker 330 could be utilized in conjunction with other non-location-based markers 330 identifiable and recognized by the object recognition application to identify the object 320. However, in some embodiments, a location-based marker 330 may be the only marker 330. For instance, in such embodiments, the mobile device 200 may utilize GPS software to determine the location of the user 310 and a compass device or software to determine what direction the mobile device 200 is facing in order to identify the object 320. In still further embodiments, the mobile device 200 does not utilize any GPS data in the identification. In such embodiments, markers 330 utilized to identify the object 320 are not location-based.

In some embodiments, the mobile device 200 accesses one or more databases or datastores (not shown) to search for and/or retrieve information related to the object 320 and/or marker 330. In some embodiments, the mobile device 200 accesses one or more datastores local to the mobile device 200 and in other embodiments, the mobile device 200 accesses datastores remote to the mobile device. In some embodiments, the mobile device 200 accesses both a memory and/or datastore local to the mobile device 200 as well as a datastore remote from the mobile device 200.

FIG. 4 illustrates a mobile device 200 wherein the user 310 has executed an object recognition application 225 and an AR application 221 and a real-time video capture device (e.g., camera 270) is utilized to display the surrounding environment 350 on the display 230 of the mobile device 200. The mobile device 200 is configured to utilize markers 330 to identify objects 320, for example individuals from the user's hometown, and indicate to the user 310 identified objects 320 by displaying a virtual image 400 on the mobile device display 230. As illustrated, if an object 320 does not have any markers 330 (or insufficient markers 330 to yield object identification), the object 320 will be displayed without an associated virtual image 400.

The object recognition application 225 may use any type of means in order to identify desired objects 320. For instance, the object recognition application 225 may utilize one or more pattern recognition algorithms to analyze objects in the environment 350 and compare with markers 330 in data storage 271 which may be contained within the mobile device 200 (such as within integrated circuit 280) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 320 within the real-time video stream, in some embodiments, the AR application 221 is configured to superimpose a virtual image 400 on the mobile device display 230. The virtual image 400 is generally a tab or link displayed such that the user 310 may "select" the virtual image 400 and retrieve information related to the identified object. The information may include any desired information associated with the selected object and may range from basic information to greatly detailed information. In some embodiments, the virtual image 400 may provide the user 310 with an Internet hyperlink to further information on the object 320. The information may include, for example, all types of media, such as text, images, clipart, video clips, movies, or any other type of information desired. In yet other embodiments, the information related to the identified object 320 may be visualized by the user 310 without "selecting" the virtual image 400

In embodiments in which the virtual image 400 provides an interactive tab to the user 310, the user 310 may select the virtual image 400 by any conventional means for interaction with the mobile device 200. For instance, in some embodiments, the user 310 may utilize an input device 240 such as a keyboard to highlight and select the virtual image 400 in order to retrieve the information. In a particular embodiment, the mobile device display 230 includes a touch screen that the user may employ to select the virtual image 400 utilizing the user's finger, a stylus, or the like.

In some embodiments, selecting the virtual image 400 will cause the AR application 221 to present the user 310 with the opportunity to purchase something, such as a gift, flowers, a service etc. associated with the individual represented as an object associated with the virtual image. In some instances, the order functionality may be a part of the AR application 221. In other embodiments, the AR application 221 may access the user's accounts associated with a financial institution enabling the user 310 to purchase an item associated with the object 320 without having to input data such as a credit card number of billing address. In other embodiments, when the user 310 selects the virtual image 400 to purchase the product, the AR application 221 will activate the web browser application 222 to allow the user to purchase the product over the Internet from a website.

In some embodiments, the virtual image 400 is not interactive and simply provides information to the user 310 by superimposing the virtual image 400 onto the display 230. For example, in some instances it may be beneficial for the AR application 221 to merely identify an object 320, providing the object's name and giving brief information about the object, such as residence, date of birth, etc., rather than provide extensive detail that requires interaction with the virtual image 400. The mobile device 200 is capable of being tailored to a user's desired preferences.

Furthermore, the virtual image 400 may be displayed at any size on the mobile device display 230. The virtual image 400 may be small enough that it is positioned on or next to the object 320 being identified such that the object 320 remains discernable behind the virtual image 320. Additionally, the virtual image 400 may be semi-transparent such that the object 320 remains discernable behind the virtual image. In other embodiments, the virtual image 400 may be large enough to completely cover the object 320 portrayed on the display 230. Indeed, in some embodiments, the virtual image 400 may cover a majority or the entirety of the mobile device display 230.

The user 310 may opt to execute the object recognition application 225 and AR application 221 at any desired moment and begin video capture and analysis. However, in some embodiments, the object recognition application 225 and AR application 221 include an "always on" feature in which the mobile device 200 is continuously capturing video and analyzing the objects 320 within the video stream. In such embodiments, the object recognition application 225 may be configured to alert the user 310 that a particular object 320 has been identified. The user 310 may set any number of user preferences to tailor the object recognition experience 300 to their needs. For instance, the user 310 may opt to only be alerted if a certain particular object 320 is identified. Additionally, it will be appreciated that the "always on" feature in which video is continuously captured may consume the mobile device power source 215 more quickly. Thus, in some embodiments, the "always on" feature may disengage if a determined event occurs such as low power source 215, low levels of light for an extended period of time (e.g., such as if the mobile device 200 is in a user's pocket obstructing a clear view of the environment 350 from the mobile device 200), if the mobile device 200 remains stationary (thus receiving the same video stream) for an extended period of time, the user sets a certain time of day to disengage, etc. Conversely, if the "always on" feature is disengaged due to the occurrence of such an event, the user 310 may opt for the "always on" feature to re-engage after the duration of the disengaging event (e.g., power source 215 is re-charged, light levels are increased, etc.).

In some embodiments, the user 310 may identify objects 320 that the object recognition application 225 does not identify and add it to the data storage 271 with desired information in order to be identified and/or displayed in the future. For instance, the user 310 may select an unidentified object 320 and enter the individual's name and/or any other desired information for the unidentified object 320. For instance, if the user 310 encounters an individual at a business meeting that she would like the object recognition application 225 to recall in a future video capture, the user 310 may record a video of the individual and/or capture a still picture of the individual and assign a virtual image 400 to the individual. In such embodiments, the object recognition application 225 may detect/record certain markers 330 (i.e. facial features, bone structure etc.) about the object 320 so that the pattern recognition algorithm(s) (or other identification means) may detect the object 320 in the future. Furthermore, in cases where the object information is within the data storage 271, but the object recognition application 225 fails to identify the object 320 (e.g., one or more identifying characteristics or markers 330 of the object has changed since it was added to the data storage 271 or the marker 330 simply was not identified), the user 310 may select the object 320 and associate it with an object 320 already stored in the data storage 271. In such cases, the object recognition application 225 may be capable of updating the markers 330 (e.g. changes to hair style, hair color, new tattoos etc.) for the object 320 in order to identify the object in future real-time video streams.

In addition, in some embodiments, the user 310 may opt to edit the information or add to the information provided by the virtual object 400. For instance, the user 310 may opt to include user-specific information about a certain object 320 such that the information may be displayed upon a future identification of the object 220. For instance, the user 310 may associate a phone number, business references, the place the user and the individual met etc. Conversely, in some embodiments, the user may opt to delete or hide an object 320 from being identified and a virtual object 400 associated therewith being displayed on the mobile device display 230. For instance, if an individual is one that is well known to the user 310, the user 310 may hide the object 320 associated with the individual so as not to crowd the display 230.

In various embodiments, information associated with or related to one or more objects 320 that is retrieved for presentation to a user via the mobile device 200 may be permanently or semi-permanently associated with the object 320. In other words, the object may be "tagged" with the information. In some embodiments, a location pointer is associated with an object 320 after information is retrieved regarding the object 320. In this regard, subsequent uses of the mobile device 200 capturing the object 320 for recognition may retrieve the associated information, tags and/or pointers in order to more quickly retrieve information regarding the object 320. In some embodiments, the mobile device 200 provides the user an opportunity to post messages, links to information or the like and associate such postings with the object 320. Subsequent users may then be presented with such postings when the mobile device 200 captures and recognizes an object 320. In some embodiments, the information gathered through the recognition and information retrieval process may be posted by the user in association with the object 320. Such tags and/or postings may be stored in a predetermined memory and/or database for ease of searching and retrieval Furthermore, in some instances, an object 320 may include one or more markers 330 identified by the object recognition application 225 that leads the object recognition application 225 to associate an object with more than one object in the data storage 271. In such instances, the user 310 may be presented with the multiple candidate identifications and may opt to choose the appropriate identification or input a different identification. The multiple candidates may be presented to the user 310 by any means. For instance, in one embodiment, the candidates are presented to the user 310 as a list wherein the "strongest" candidate is listed first based on reliability of the identification. Upon input by the user 310 identifying the object 320, the object recognition application 225 may "learn" from the input and store additional markers 330 in order to avoid multiple identification candidates for the same object 320 in future identifications.

In some embodiments, the processor 210 may also be capable of operating one or more applications, such as one or more applications functioning as an artificial intelligence ("AI") engine. The processor 210 may recognize objects that it has identified in prior uses by way of the AI engine. In this way, the processor 210 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments the AI engine recognizes an object that has been recognized before and stored by the AI engine. The AI engine may then communicate to another application or module of the mobile device, an indication that the object may be the same object previously recognized. In this regard, the AI engine may provide a baseline or starting point from which to determine the nature of the object. In other embodiments, the AI engine's recognition of an object is accepted as the final recognition of the object.

Additionally, the object recognition application 225 may utilize criteria for identification other than identification algorithms. For instance, the object recognition application 225 may utilize the user's location, time of day, season, weather, speed of location changes (e.g., walking versus traveling), "busyness" (e.g., how many objects are in motion versus stationary in the video stream), as well any number of other conceivable factors in determining the identification of objects 320. Moreover, the user 310 may input preferences or other metrics for which the object recognition application 225 may utilize to narrow results of identified objects 320.

FIG. 5 illustrates a process flow 500 for determining which objects 320 (FIGS. 2 and 3) from the real-time video stream are associated with individuals meeting a user defined criteria 120. As represented by block 510, an individual is identified from the image captured in the real time video stream. The object recognition application 225 then collects additional information regarding the identified individual, as represented by block 520. This additional information may include any information that is available to the user 310. For an individual user, such information may include, but is not limited to information from social networking sites if the user 310 and the individual are connected, information from any correspondence or electronic communications exchanged between the user 310 and the individual, information generally available through an online search of the Internet, information collected by the user's mobile device from the identified individual's mobile device if the devices are in communication etc. For a user 310 such as a financial institution or a merchant, such additional information regarding the identified individual may include additional sources of information such as account history data, transactional data, biographical data etc. that is available to the financial institution, merchant or the like due to prior interactions with the individual. The information may be collected by the mobile device, for example, the object recognition application 225, utilizing the web browser application 222, the processor 210 and the network interface 260 to access the Internet and collect the information. In other embodiments the additional information may be stored in memory that is accessible by the mobile device. As represented by block 530, this additional information is correlated to the user defined criteria. The user defined criteria may be any quality, restriction or limitation that the user 310 desires to identify in an unknown individual. For instance, and without limitation, such criteria may include, involvement or association with a certain group, business, organization or the like, location of origin, current residence, location of prior schooling, employment, interests, hobbies, likes, dislikes, inclusion in a specified image database, customer list, roll call and the like. These user defined criteria allow the object recognition application 225 to not only identify an individual by name, but also to identify individuals according to certain desired characteristics. In some embodiments (not shown) an apparatus having the process flow 500 may also include the step of communicating information to the individuals identified as being correlated to the user defined criteria. For example, in use an apparatus consistent with embodiments of the present invention may allow a merchant at a concert to use a mobile device 200 to scan segments of the audience at the concert in order to identify concert goers who are at the concert and have previously attended a similar concert in the previous six months in order to market future concerts to the identified individuals. The object recognition application 225 may identify individuals in the audience by comparing the captured image to images taken from the performer's fan club website. Once individuals are identified the object recognition application 225 may use the identifying information to collect additional information from the Internet (i.e. social networking sites, web posts, blog entries etc.) and from transactional data available to the merchant to determine if the identified individual has attended another concert in the previous six months. If any individuals in the video stream have recently attended another concert the AR application 221 will present an indicator on the display and the merchant can approach the identified individual at the concert to offer a deal for future concert tickets or an offer may be automatically communicated to the identified individual(s). Similarly, the mobile device may be used to capture an image or real time video stream of concert goers, identify the individuals in the image and determine which of those individuals in the image are not currently members of the performer's fan club or following the performer on a social networking site etc. and communicate an invitation to join the fan club or follow the performer to all such individuals. The apparatus may also be used for security purposes by comparing captured images to a database, such as a police bulletin with images of persons of interest to determine if any of the images in the data stream match the images of the persons of interest.

In use, embodiments of the invention having the process flow 500 may also allow a user to organize individuals attending an event, such as a wedding, convention, business meeting etc., according to similar interests. For example, a mobile device may be used to capture a live video stream of the attendees at a wedding as they enter the ceremony. The object recognition application 225 may identify individuals from the captured image 510 and collect additional information about the identified individuals 520, such as the individual's interests, hobbies, field of employment etc. The object recognition application 225 or a different application accessible to the mobile device 200 and its processor 210 may then group the individuals that have similar (or compatible) interests and assign such individuals to the same tables at the wedding reception. This grouping may be presented to the user on the display of the mobile device 230 or in certain embodiments may be communicated directly to the identified individuals.

Referring now to FIG. 6, which provides a process flow 600 for a system or apparatus for identifying an individual from the image captured in the real-time video stream 510. As shown in block 610, images that are available to the user are collected. Such images may include, but are not limited to publicly available images, such as those available over the Internet, images from social networking sites of which the user 310 is a member, images stored on an accessible memory source and images preserved in hard copies such as printed pictures that are subsequently scanned or converted into digital images and stored on an accessible memory source. In some embodiments, the user may be able to access images maintained and stored by a third-party merchant or vendor. For instance, and without limitation, individuals may make images available to a third-party provider to be accessed by the object recognition application 225 for comparison to images captured in the real-time video stream rather than making the images generally available to each specific user or the general public. As shown in block 620, the identifiable characteristics from the images captured in the real-time video stream are compared with the images available to the user. Identifiable characteristics may include, facial features, bone structure, body shape, height, hair color, hair style, individually recognizable marks, etc. As represented by block 630, if the image comparison suggests a match, information about the individual is identified. Such information can include the individual's name, e-mail address or any other personally identifying information.

Consider for example, a user 310 who activates the object recognition application 225 and AR application 221 on the mobile device 200 in an effort to identify individuals from a group of individuals with whom the user graduated from high school. The mobile device 200 captures a real-time video stream of a group of individuals. Either contemporaneously with the capture of the real-time video stream or at an earlier time, a plurality of images that are available to the user will be collected. In this example, the user 310 may scan a series of pictures from a high school year book and store these electronic images to a memory device, such as the memory 220, that can be accessed by the object recognition application 225. Alternatively, the object recognition application 225 may collect the images from an online source, for instance a class reunion website, a social networking site, the school's website etc. These images are then compared to the images captured in the real-time video stream and the object recognition application 225 compares the markers 330 to similar characteristics in the image files. If the object recognition application 225 suggests that an image available to the user is the same as an individual in the video stream, information about the individual will be identified. In some instances this information may be stored in the memory 220 and associated with the image file. In other instances, the information will be collected from the online site, database etc. from which the image was originally collected. In the current example, the user 310 may have manually associated names from the yearbook with the images he scanned and saved to memory. The object recognition application 225 once it has a matching image and at least one piece of identifying information, such as a name or email address, additional information may be collected about the individual, for instance from the school's website, a newspaper archives discussing the graduation etc. to confirm that the identified individual was in the user's graduating class. If the individual was in the user's graduating class the AR application 221 will present a virtual image 400 on the display 230 of the mobile device 200 and the user may have the option to select the virtual image 400 to view additional information about the individual, such as name, marital status, employment status, current place of residence etc. In another example, a user, similar to the user in the example above who has scanned a series of images from a high school yearbook, might also use the object recognition application 225 to identify all of the attendees at a class reunion. The user would collect an image at the reunion, e.g. a group picture, and the object recognition application 225 would compare the images in the photograph to the previously scanned images and identify the members of the graduating class that are in attendance at the reunion. The object recognition application 225 or a separate application might then generate an attendee list and communicate this information to all of the individuals identified in the picture so that all attendees would know who else was attending the reunion.

Referring now to FIGS. 7 and 8, a series of exemplary display pages 700 and 800 of a mobile device 200 consistent with an embodiment of the present invention are provided. It will be understood, that in some embodiments, each of the pages 700 and 800 are displayed on the display 230 of the mobile device 200. It will also be understood that the mobile device 200 is configured, in some embodiments to navigate from page 700 to page 800 and/or vice versa either by actuating one of the buttons 730 or one of the other input devices 240. It will be further understood that the display pages 700 and 800 can be embodied as portions of the object recognition application 225, as Internet web pages and/or the like. In addition, it will be understood that, in some embodiments, the apparatus having the process flow 100, 500 and 600 are configured to implement any one or more of the embodiments of the present invention described and/or contemplated herein in connection with the display pages 700 and 800.

Referring now to FIG. 7, it will be understood that in some embodiments, the display page 700 is displayed in connection with receiving a user defined criteria as part of determining which images from a real-time video stream are associated with a person meeting the user's defined criteria, as represented by block 120 of the apparatus having a process flow 100. Alternatively, the display page 700 is displayed after the customer navigates to the page from the other display page 800. As shown, in this embodiment, the display page 700 includes a field for inputting user defined characteristics to be correlated to the individual 710 and a button 720 for submitting the search terms for use in connection with identifying individuals that are consistent with the identified criteria. In this embodiment, the user may input any terms that the user wants to be associated with individual. For instance, the user 310 may enter "born 1992" in the field 710 and actuate the button 720 and the object recognition application 225 will correlate the individuals identified in the real-time video stream to individuals born in 1992. As another example, the user 310 may enter a specific name in the field 710 and the system will seek to correlate the images in the real time video stream with an individual having the requested name. It will be understood that the search terms can be combined using conventional Boolean operators and the like.

In some embodiments, as shown in FIG. 7 the display page 700 will also include an area for listing available image databases 730, check boxes to allow a user to select an image database 740, 750 a check box to allow the user to identify an image file from an accessible memory 760 and a button 770 for enabling the user to browse the data files to select the desired image file. For example, in use, the user 310 may want to identify individuals in a real-time data stream that are within the user's social network connections and who are interested in wakeboarding. The user 310 will navigate to display page 700, enter "wakeboarding" into field 710, actuate the checkbox 740 associated with social network connections and actuate the submit button 720. The user 310 may then direct the mobile device 200 to capture a real-time video stream that includes a grouping of people. The object recognition application 225 may then collect images from the social networks to which the user belongs and compare the identifiable characteristics of the individuals in the video stream to the images from the social network. If the system determines that a comparison of the identifiable characteristics suggests a match, the object recognition application 225 will identify information about the individual to identify him or her, such as the person's name. Subsequently the system will collect information about the individual to determine if the individual is interested in wakeboarding. So for instance, if the identified individual's profile page on the social networking site from which the image was collected indicates that one of the individual's hobbies is wakeboarding, the AR application 221 will present an indicator on the display 230 of the mobile device 200. Similarly, a user may be at a sporting event and want to determine if any of her colleagues are attending the same event. The user might select a database of images of her work colleagues by actuating the file allowing her to select a specific file 760 and selecting the button 770 to choose the appropriate file. The user 310 might then enter the name of the sporting arena or event into the field 710 and actuate the button 720. Using the camera from her mobile device 200, the user 310 would then scan the arena and be presented with virtual images 400 on the mobile device display 230 of individuals the user works with that are at the event. In some embodiments, the user might then select one of the virtual images and be presented with information about the identified individual and may have the option of sending a communication to the individual indicating that she is at the event and that they should meet at a specified location.

The display page 800 of FIG. 8, in some embodiments is displayed in connection with an apparatus performing block 130 of the process flow 100. Referring to FIG. 3, after identifying an object 320 (i.e. an individual matching the user defined criteria) within the real-time video stream, the AR application 221 is configured to superimpose a virtual image 400 on the mobile device display 230. In some embodiments selecting the virtual image 400 navigates the user to display page 800 to enable the user to view additional information about the identified individual. As shown, in this embodiment, the display page 800 includes an image of the individual 810, the individual's name 820, the individual's location (e.g. current residence, home town etc.) 825, the individual's date of birth 830 and additional information (e.g. hobbies, place of employment, marital status, family information etc) 840. In certain embodiments of the invention (not shown) the additional information may include gift wish lists and/or the option to purchase goods or services to be sent to the individual. In such embodiments, the display page may include a link or button to navigate the user 310 to an additional display page or website where the user can enter information, such as credit card numbers and billing addresses, to complete the purchase. In other embodiments, the AR Application 221 will be linked to the financial institution of the user so the purchase(s) are automatically completed and no additional information is required from the user. In other embodiments, the additional information may indicate locations where the individual typically likes to go (as determined from the additional information collected about the identified individual 520) and provide the user with the ability to invite the individual to meet at one of the identified locations. As an example of certain embodiments of the invention involving display page 800, a business traveler may have the mobile device 200 and the object recognition application 225 and AR application 221 in an "always-on" mode in a breast pocket or belt clip wherein the mobile device 200 may continuously capture real-time video. As the business traveler gets on to an airplane the mobile device 200 captures images of the individuals seated on the plane and compares the images to images available to the user, for example a database created by the user with images of the user's business contacts. The object recognition application 225 may then determine which images from the real-time video stream are associated with a business contact that may have capacity to conduct additional business with the user. As the business traveler approaches her seat, she receives a notification from the mobile device 200 and looks to the mobile device display 230 and selects the virtual image 400 presented on the display. Selecting the virtual image 400 presents the user with display page 800 wherein a picture of an individual, in this case the individual seated in the row behind the business traveler, is displayed along with her name, employer, position and additional information about the contact indicating that this individual has done business with the user in the past and may be in a position to do additional business now.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |

-continued

| U.S. Provisional Ser. No. | Filed On | Title |
| --- | --- | --- |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508.985 | Jul. 18, 2011 | Providing Information Regarding Medical Conditions |
| 61/508,980 | Jul. 18, 2011 | Providing Affinity Program Information |
| 61/508.821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method of identifying individuals comprising:
    capturing with a mobile device a real-time video stream of a user's environment, the video stream including images from the user's environment;
    determining, via a processor, which images from the real-time video stream are associated with a person meeting a predetermined criteria, wherein determining which images from the real-time video stream are associated with a person meeting a predetermined criteria comprises identifying an individual from the image captured in the real-time video stream, and wherein identifying an individual from the image captured in the real-time video stream comprises:
    collecting images available to the user,
    comparing identifiable characteristics from the captured images with the images available to the user, wherein comparing identifiable characteristics from the captured images with the images available to the user comprises modifying the images available to the user to adjust for changes that are likely to have occurred to the individual due to the passage of time, and
    identifying information about the individual if the comparison of the captured image to the images available to the user suggests a match; and
    presenting, via a display on the mobile device, one or more indicators, each indicator associated with an image determined to be a person meeting a predetermined criteria.

2. The method of claim 1, wherein the mobile device is a mobile phone.

3. The method of claim 1, wherein determining which images from the real-time video stream are associated with a person meeting a predetermined criteria further comprises:
    collecting additional information regarding the identified individual; and
    correlating the additional information to the predetermined criteria.

4. The method of claim 3 wherein the additional information regarding the identified individual comprises at least one of publicly available information, information from social networking sites wherein the user and identified individual are connected, information from electronic communications available to the user concerning the identified individual or information stored on the identified individual's computing devices if the devices are in communication with the mobile device.

5. The method of claim 3 wherein the additional information regarding the identified individual is collected from account history data, transactional data and biographical data available to a merchant.

6. The method of claim 3 wherein determining which images from the real-time video stream are associated with a person meeting a predetermined criteria further comprises receiving from the user one or more criteria.

7. The method of claim 1 wherein the images available to the user comprise at least one of publicly available images, image from social networking sites of which the user is a member, images stored on an accessible memory source.

8. The method of claim 1 further comprising the step of communicating information to persons identified as meeting the predetermined criteria.

9. The method of claim 1, wherein the indicators are selectable by the user.

10. The method of claim 1, wherein the indicators, upon being selected present the user with additional information about the person meeting the predetermined criteria.

11. The method of claim 1, wherein the indicators, upon being selected present the user with the ability to take a first action in relation to the person meeting the predetermined criteria.

12. The method of claim 11, wherein the first action comprises at least one of sending an electronic message to the person, calling the person, purchasing goods and sending the goods to the person or purchasing services for the person.

13. An apparatus comprising:
    a device for capturing a real-time video stream of a user's environment, the video stream including images from the user's environment;
    a processor operably connected to the device, configured to determine which
    images from the real-time video stream are associated with a person meeting a predetermined criteria, wherein the processor, in determining which images from the real-time video stream are associated with a person meeting a predetermined criteria, is configured to identify an individual from the image captured in the real-time video stream, and wherein the processor in identifying an individual from the image captured in the real-time video stream, is further configured to:

collect images available to the user, compare identifiable characteristics from the captured images with the images available to the user, wherein the processor, in comparing identifiable characteristics from the captured images with the images available to the user, is further configured to modify the images available to the user to adjust for changes that are likely to have occurred to the individual due to the passage of time, and identify information about the individual if the comparison of the captured image to the images available to the user suggests a match; and a display operably connected to the processor, for presenting one or more indicators, each indicator associated with an image determined to be a person meeting a predetermined criteria.

14. The apparatus of claim 13 wherein the device is a mobile device.

15. The apparatus of claim 13 wherein the processor, in determining which images from the real-time video stream are associated with a person meeting a predetermined criteria, is further configured to:

collect additional information regarding the identified individual; and correlate the additional information to the predetermined criteria.

16. The apparatus of claim 15 wherein the additional information regarding the identified individual comprises at least one of publicly available information, information from social networking sites wherein the user and the identified individual are connected, information from the electronic communication available to the user or information stored on the identified individual's computer devices if the devices are in communication with the mobile device.

17. The apparatus of claim 15 wherein the additional information regarding the identified individual is collected from account history data, transactional data and biographical data available to a merchant.

18. The apparatus of claim 15 wherein determining which images from the real-time video stream are associated with a person meeting a predetermined criteria further comprises receiving from the user one or more criteria.

19. The apparatus of claim 13 wherein the images available to the user comprise at least one of publicly available images, images from social networking sites of which the user is a member, or images stored on an accessible memory source.

20. The apparatus of claim 13 wherein the processor is further configured to communicate information to persons identified as meeting the predetermined criteria.

21. The apparatus of claim 13, wherein the indicators are selectable by the user.

22. The apparatus of claim 13, wherein the indicators, upon being selected present the user, via the display, with additional information about the person meeting the predetermined criteria.

23. The apparatus of claim 13, wherein the processor is configured to present the user with the ability to take a first action in relation to the person meeting the predetermined criteria upon selection of an indicator.

24. The apparatus of claim 23, wherein the first action comprises at least one of sending an electronic message to the person, calling the person, purchasing goods and sending the goods to the person or purchasing services for the person.

25. A computer program product, comprising:

a non-transitory computer-readable medium having computer-executable code stored thereon, the computer executable code comprising:

a first code portion configured to capture, via a mobile device a real-time video stream of a user's environment, the video stream including images from the user's environment;

a second code portion configured to determine which images from the real-time video stream are associated with a person meeting a user defined criteria, wherein the second code portion, in determining which images from the real-time video stream are associated with a person meeting a user defined criteria, is configured to identify an individual from the image captured in the real-time video stream, and wherein the second code portion, in identifying an individual from the image captured in the real-time video stream, is further configured to:

collect images available to the user;

compare identifiable characteristics from the captured images with the images available to the user, wherein the second code portion, in comparing identifiable characteristics from the captured images with the images available to the user, is configured to modify the images available to the user to adjust for changes that are likely to have occurred to the individual due to the passage of time;

identify information about the individual if the comparison of the captured image to the images available to the user suggests a match; and a third code portion configured to present on a display one or more indicators, each indicator associated with an image determined to be a person meeting the user defined criteria.

26. The computer program product of claim 25, wherein the second code portion, in determining which images from the real-time video stream are associated with a person meeting a user defined criteria, is further configured to:

collect additional information regarding the identified individual; and correlate the additional information to the user defined criteria.

27. The computer program product of claim 26 wherein the additional information regarding the identified individual comprises at least one of publicly available information, information from social networking sites wherein the user and the identified individual are connected, information from the electronic communication available to the user or information stored on the identified individual's computer devices if the devices are in communication with the mobile device.

28. The computer program product of claim 26 wherein the additional information regarding the identified individual is collected from account history data, transactional data and biographical data available to a merchant.

29. The computer program product of claim 26 wherein the second code portion in determining which images from the real-time video stream are associated with a person meeting a user defined criteria is further configured to receive from the user one or more criteria.

30. The computer program product of claim 25, wherein the images available to the user comprise at least one of publicly available images, images from social networking sites of which the user is a member, or images stored on an accessible memory source.

31. The computer program product of claim 25 further comprising a fourth code portion configured to communicate information to persons identified as meeting the user defined criteria.

32. The computer program product of claim 25, wherein the indicators are selectable by the user.

33. The computer program product of claim 25, wherein the indicators, upon being selected present the user, via the display, with additional information about the person meeting the user defined criteria.

34. The computer program product of claim 25, wherein the third code portion is further configured to present the user with the ability to take a first action in relation to the person meeting the user defined criteria upon selection of an indicator.

35. The computer program product of claim 25, wherein the first action comprises at least one of sending an electronic message to the person, calling the person, purchasing goods and sending the goods to the person or purchasing services for the person.

* * * * *